June 21, 1927. 1,633,492
E. M. MORLEY
PNEUMATIC TIRE CHARGING EQUIPMENT
Filed March 6, 1926 2 Sheets-Sheet 1
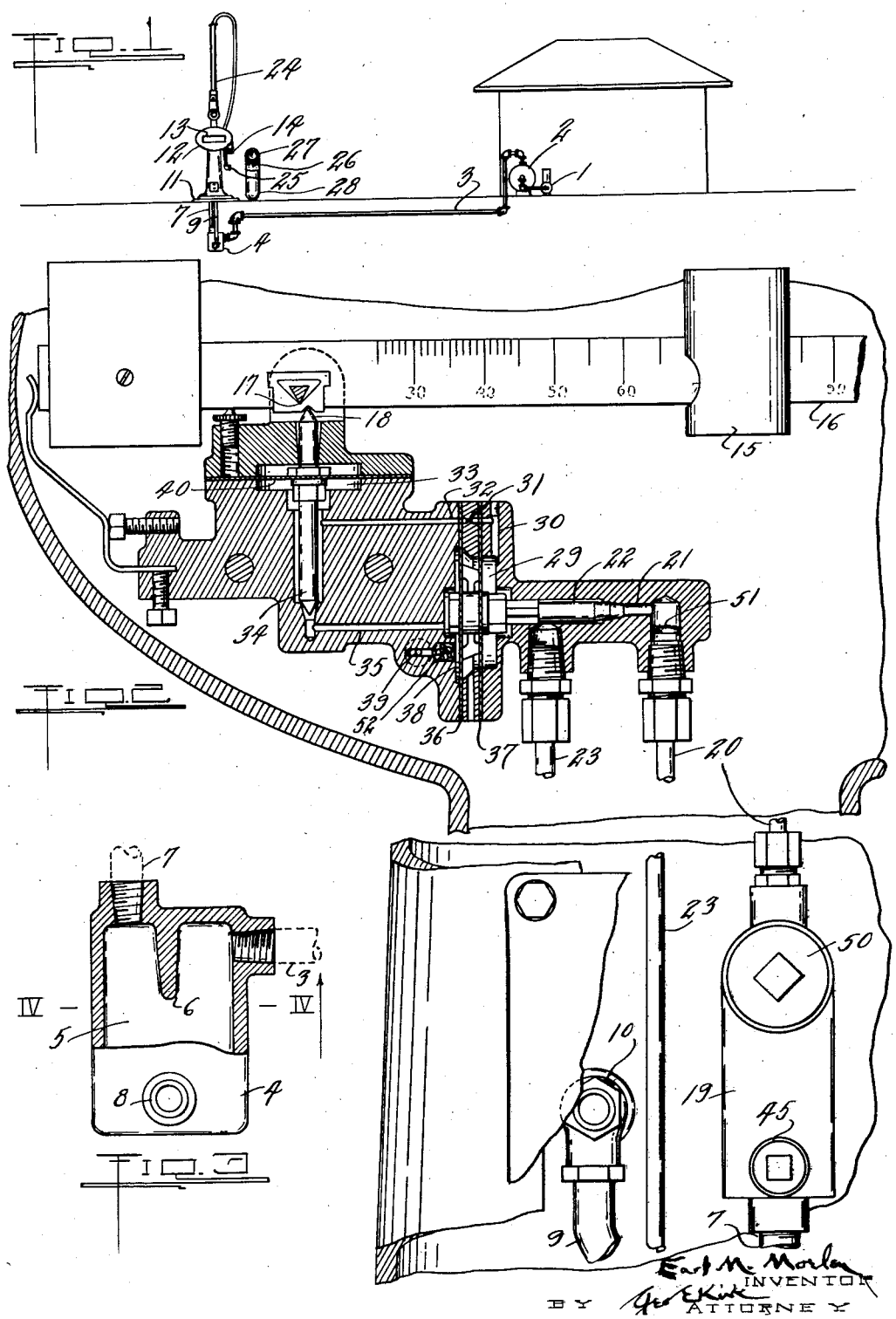

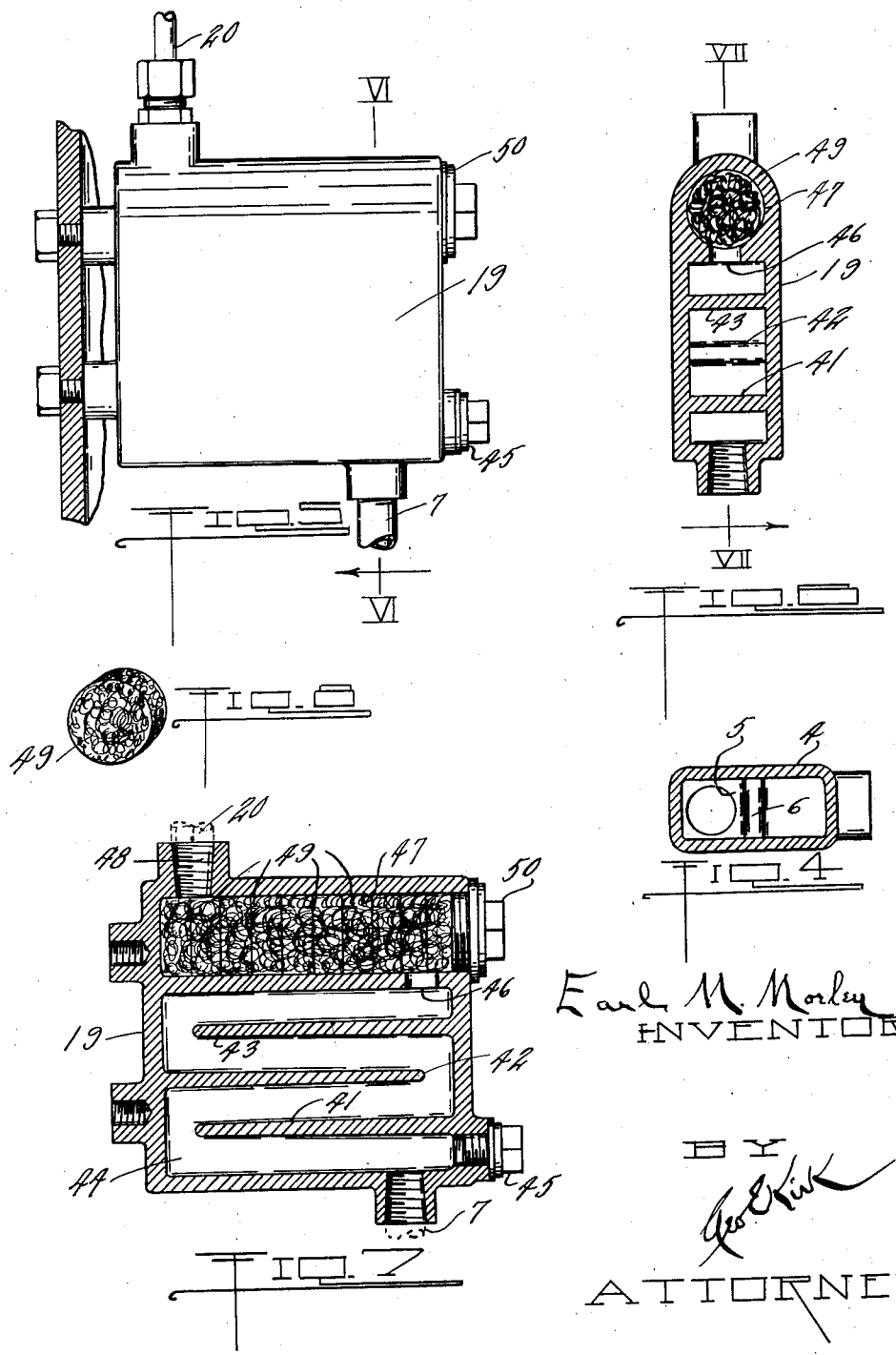

Patented June 21, 1927.

1,633,492

UNITED STATES PATENT OFFICE.

EARL M. MORLEY, OF DELTA, OHIO, ASSIGNOR TO THE AIR-SCALE COMPANY, OF TOLEDO, OHIO, A CORPORATION OF OHIO.

PNEUMATIC-TIRE-CHARGING EQUIPMENT.

Application filed March 6, 1926. Serial No. 92,790.

This invention relates to pneumatic tire charging equipment.

This invention has utility when incorporated in pressure air connections between the pump or reservoir and an automatic controlling valve for direct delivery from said valve to the rubber or elastic inner tube of a pneumatic tire.

Referring to the drawings:

Fig. 1 shows an embodiment of the apparatus in an installation for charging pneumatic tires such as is common at motor vehicle service and fuel and oil filling stations;

Fig. 2 is a fragmentary view, with parts broken away, showing an assembly of one of the entrained particle removers and portion of the valve;

Fig. 3 is a fragmentary view of a liquid precipitate remover;

Fig. 4 is a section on the line IV—IV, Fig. 3, looking in the direction of the arrow;

Fig. 5 is a view from the left of the entrained particle remover, as shown in Fig. 2, at the lower right hand portion;

Fig. 6 is a section on the line VI—VI, Fig. 5;

Fig. 7 is a section on the line VII—VII, Fig. 6; and

Fig. 8 is a detail view of a particle entraining element such as impacted into the chamber or housing for the device shown in Fig. 7.

Pump 1 is motor operated, as a compressor, for supplying compressed air to reservoir 2 from which extends line 3 to entrained particle remover 4 having therein condensation receiver chamber 5 with baffle 6 between the intake line 3 and discharge line 7. From the lower portion of this housing 4, there is drain outlet 8 connected to riser pipe 9 having controllable valve 10 therein as a blow-off. Accordingly, by opening the valve 10, the accumulation of pressure in the lines 3, 7, serves automatically to blow out the collection of condensation in this housing 4. Rising from this housing 4, line 7 extends into base or standard 11 upwardly terminating in head 12 having window 13. Control knob 14 serves for shifting weight 15 on lever 16 having fixed fulcrum 17 thereby providing a variation in the application pressure to stem 18 as a valve controlling means for pressure air as supplied by line 7 past housing 19 by way of line 20 into passage 21 where plunger 22 may be automatically unseated when pressure is lowered in line 23 extending to arm 24 terminating in valve head 25 for application to valve stem 26 connected to rubber inner tube 27 of pneumatic vehicle tire 28. The release in the pressure at the line 23 coacts for shifting the plunger 22 due to the line 23 being in communication back of the plunger 22 with chamber 29, duct 30, restriction 31, duct 32, chamber 33 having plunger 34, as controlled by the plunger 18 to duct 35 in communication with the opposite side of diaphragms 36, 37, from the chamber 29. Duct 35 as extending to the diaphragm 37 in chamber 38 has adjustable seepage valve 39.

As there is pressure drop in the line 23, diaphragm 40 allows the plunger 34 to be unseated so that the pressure in the line 20 is effective for unseating the plunger 22. As the pressure builds up in the duct 23, due to the tire inner tube 27 being inflated to the adjusted amount as determined by the weight 15 on the lever beam 16, the back pressure in the line 23 is effective from chamber 29 past the plunger 34 to the opposite sides of the diaphragms 36, 37, and in the chamber 33 acts upon the diaphragm 40. At this time there is pressure in the chamber 33 reacting on the diaphragm 40 proportional to the adjustment of the lever beam 16 to determine the reseating of this plunger 34 thereby holding the pressure in the chamber 33 to govern back in the chamber 29, as a cut-off while the pressure in the chamber 38 has been effective for seating the plunger 32 against further supply of air. The pulsatory delivery of air hereunder is against back pressure, which back pressure is increasing as the air delivery is maintained.

In the handling of air, especially under the variable conditions of atmosphere and under the practice of plunger type of pumps which are lubricated, there is brought into the receiver 2, not only excess of humidity to separate out from the air, but there are the normal impurities of entrained particles in the air to which are further added the lubricant particles of vapor, liquid and solid matter from the pump 1. As the air pressure is reduced, its capacity for taking on liquid, as moisture, is at once increased. In the flow hereunder, from a drop and then a building up of pressure, there is a tendency to grab moisture as the pressure drops, and then as the pressure builds up to redeposit such along the line. This creeping of seepage is further aggravated by the capillary action of the moisture as well as of the oil. There is, accordingly, a resultant tendency for coating the lines with foreign matter or particles deleterious to elastic material, as rubber inner tubes. This matter is of great importance in pneumatic tire filling equipment and is herein made effective by the condensation housing 4 precipitating, as a baffle device, entrained particles which accumulate together with the condensation. Furthermore, there is supplemental particle remover not only for liquid or vapor impurities but for solids as well as coacting even against gumming up by such impurities so that the equipment as charged may be in heavy service for months at a time without requiring attention. To this end, housing 19 is provided with baffles 41, 42, 43, providing tortuous passage 44 from the line 7. This passage 44 is provided at its lower region with a plug 45 which may be readily removed for clean-out. Removal of this plug 45 may serve to release, on blow back, liquid accumulation as well as particles of solid matter or dust. From this passage 44, there is in the upper region outlet 46 into chamber 47 which, at its remote end, has delivery opening 48 to the line 20.

In the chamber 47, are impacted fibrous disks 49, of felt and which is preferably waterproofed. These waterproofed slugs or disks 49 are of greater diameter than the chamber 47, and are compressed therein, as to diameter, and further longitudinally compressed by plug 50. This housing unit is, as shown, in the line between the receiver or supply tank 2 and the automatic direct delivery valve device in the head 12 which is adjustably controlled by the weight 15 on the lever beam 16. This automatic valve in operation has a tendency according to the leakage adjustment 39 to rock the beam 16 and accordingly allow the delivery of the air by spurts to the inner tube 27. Notwithstanding the compacted waterproofed fibrous mass in the chamber 47, there is permitted a capacity of flow for rapid filling or building up of reduced pressures in the inner tubes 27. Furthermore, such is with air which is free of deleterious entrained particles as to the rubber or elastic inner tube. Notwithstanding the moisture or oil accumulations which may be in the air, due to humidity or pump conditions, such even after months of use does not penetrate to an appreciable extent lengthwise of the chamber 47 away from the supply opening 46. The co-operation is accordingly between the housing 4 and its configuration and the housing 19 for effective intermittent tire air delivery against deleterious foreign materials. Furthermore, in this combination of the liquid separator chamber 4 and the entrained particles separator chamber 19, there is an additional co-operative feature of the chamber 19 in its regulation of dampening control for ironing out or giving smoothness to the air delivery pulsations independently of hammering the equipment.

Due to periods of rest and temperature changes, humidity condition of the air between the chamber 19 and the head containing the valve may result in condensation, or through carelessness of workmen there may get into the duct 20 particles of matter. Screen 51 between the duct 20 and port 21 will safeguard the plunger 22 from disturbance by any such. As to pressure changes in the equipment against back flow with periods of rest into the chamber 38, thus to retard humidity to work back therein, fibrous packing 52 is provided between the chamber 38 and the seepage vent 39.

What is claimed and it is desired to secure by United States Letters Patent is:

1. A pneumatic tire air charger comprising a compressed gas supply, a line therefrom, a delivery valve for supplying air from the line to a pneumatic tire, and means in said line for removal of non-gaseous material, said means embodying a condensation receiver, a blow-off therefrom, and an entrained particle remover including a filter providing an impediment to gas flow for slowing up valve operation to reduce tendency to hammer.

2. A pneumatic tire air charger comprising a compressed gas supply, a line therefrom, a delivery valve for supplying air from the line to a pneumatic tire, and chamber means in said line for accumulating non-gaseous material, said means embodying a condensation receiver, a blow-off therefrom, and an entrained particle remover including compacted fiber providing impediment for slowing up valve pulsations.

3. A pneumatic tire air charger comprising a compressed gas supply, a line therefrom, a delivery valve for supplying air from the line to a pneumatic tire, and a compacted waterproofed fiber section in said line providing impediment for slowing up valve pulsations.

4. A pneumatic tire air charger comprising a compressed gas supply, a line therefrom, a delivery valve repeatedly pulsating during air supply from the line to a pneumatic tire up to a maximum pressure, and retarder means in said line for slowing up air flow providing an impediment therein coacting to smooth out the pulsating operation of said valve.

5. A pneumatic tire air charger comprising a compressed gas supply, a line therefrom, a pulsating delivery valve for supplying air from the line to a pneumatic tire, and an entrained particle remover in said line coacting to check hammering action of said valve, said remover including a baffle section having a clean-out, a compacted waterproofed fiber section, and a closure plug for compacting waterproofed fiber in said fiber section.

6. A pneumatic tire air charger comprising a compressed gas supply, a line therefrom, a pulsating delivery valve for supplying air from the line to a pneumatic tire, and an entrained particle remover flow retarder coacting with the pulsating valve to slow up the flow changes against causing hammering action of the valve.

In witness whereof I affix my signature.

EARL M. MORLEY.